United States Patent [19]

Borchering et al.

[11] Patent Number: 5,802,143
[45] Date of Patent: Sep. 1, 1998

[54] IDENTIFICATION OF DAMAGED CABLE PAIRS IN A TELECOMMUNICATIONS NETWORK AND RESTORATION OF TELEPHONE SERVICE TO SUBSCRIBERS

[75] Inventors: James William Borchering, West Chicago; William Jackson Bushnell; T A. Kleinheksel, both of St. Charles; William Henry Werber, Palatine, all of Ill.

[73] Assignee: Lucent Technologies Inc., Murray Hill, N.J.

[21] Appl. No.: 572,457

[22] Filed: Dec. 14, 1995

[51] Int. Cl.[6] .............................. H04M 1/24; H04M 3/08; H04M 3/22

[52] U.S. Cl. .................... 379/32; 379/10; 379/12; 379/18; 379/27

[58] Field of Search ........................ 379/1-2, 5-6, 379/7, 10, 12, 15-17, 21-22, 25, 27, 29, 31-34, 26; 324/512, 529, 531, 539

[56] References Cited

U.S. PATENT DOCUMENTS

| 4,937,851 | 6/1990 | Lynch et al. | 379/6 |
| 5,195,124 | 3/1993 | Ishioka | 379/8 |
| 5,457,729 | 10/1995 | Hamann et al. | 379/12 |

Primary Examiner—Curtis A. Kuntz
Assistant Examiner—Binh K. Tieu
Attorney, Agent, or Firm—Mony R. Ghose

[57] ABSTRACT

A method for identifying damaged cable pairs in a pulp cable comprises arbitrarily attaching proximal ends of damaged cable pairs to ports on a first connector block of a service restoration system (SRS), and arbitrarily attaching distal ends of damaged cable pairs to ports on a second connector block of the SRS. Directory number information associated with each damaged cable pair is retrieved by the SRS from affected subscribers, and the serving switch. If a match of directory number information is found, the proximal damaged cable pair end is interconnected to the distal damaged cable pair end of a single cable pair via SRS switch fabric. The SRS periodically generates a status report including port locations of corresponding ends of a damaged cable pair so that the ends may be permanently spliced together.

14 Claims, 7 Drawing Sheets

IDENTIFICATION OF DAMAGED CABLE PAIRS IN A TELECOMMUNICATIONS NETWORK AND RESTORATION OF TELEPHONE SERVICE TO SUBSCRIBERS

TECHNICAL FIELD

This invention relates to the field of telecommunications networks and, more particularly, to efficiently identifying, and restoring service to damaged cable pairs contained in a distribution cable containing indistinguishable cable pairs in such telecommunications networks.

BACKGROUND OF THE INVENTION

Providers of local telecommunications services, commonly referred to as local exchange carriers (LECs), supply dial tone to customer premises equipment used by service subscribers. Each unit of customer premises equipment, such as a telephone or facsimile machine, is inter-connected to LEC switching equipment by customer lines (or "cable pairs"). Each cable pair comprises a first end which terminates at the customer premises equipment, and a second end which terminates at a main distributing frame in a LEC central office. To facilitate the connection of hundreds of subscribers to LEC equipment, cable pairs from a particular geographic area extend from subscriber property to a "pedestal". The pedestal serves as a junction point from which a plurality of cable pairs extend to a cross connection box. The cable pairs from multiple pedestals form a distribution cable which extends from the cross connection box to the main distributing frame prior to terminating at a LEC switch. In one common implementation, the distribution cable is supported by telephone poles which extend the cable in the air until it is in proximity to the main distributing frame. Alternatively, the cable may extend underground before connecting to the main distributing frame.

Occasionally, telephone cables are damaged by natural forces or, due to human error. When cable damage occurs, LEC craftspeople are dispatched to the damage site to begin a service restoration process. Modern, high-quality cables are comprised of color-coded cable pairs which enable the craftsperson to simply match colors among cable pairs to identify corresponding ends of a damaged cable pair. Once corresponding damaged ends of a cable pair are located, the damaged ends are spliced together to restore service.

There are, however, a significant number of older, "pulp" cables deployed in local telecommunications networks. Pulp cables do not contain colorcoded cable pairs. Indeed, the individual cable pairs in a pulp cable are indistinguishable from one another. For this reason, service restoration of a damaged pulp cable involves a lengthy, labor-intensive identification process. The process requires a craftsperson to be dispatched to the cable damage site, and to both terminating ends (that is, the cross connection box end, and the main distributing frame end) of the damaged pulp cable. At each damaged end of the cable, individual cable pairs are attached to connector blocks. Using LEC cable records, a cross connection box termination point, and a main distributing frame termination point are identified for each damaged cable pair. Subsequent to the determination of the termination points, a signal detector is attached to each damaged end of every cable pair so that a signal at a first damaged end can be matched with a signal at a second damaged end. A matching signal determines corresponding damaged ends of a single cable pair. Corresponding ends are spliced together using known techniques. The cable pair identification, and splice process is repeated until service is restored to all damaged cable pairs.

Using current procedures, several days may pass before telephone service is restored to all subscribers affected by a damaged pulp cable. As competition becomes a reality in the local telecommunications service market, the LECs are well aware that subscriber satisfaction is critical. The ability to avoid prolonged disruption of telephone service is a significant advantage to a LEC because it prevents subscriber inconvenience, and frustration. Therefore, there is a need in the art for efficiently identifying corresponding ends of damaged cable pairs, and quickly restoring telephone service to subscribers affected by pulp cable damage.

SUMMARY OF INVENTION

This need is addressed and a technical advance is achieved in the telecommunications art by the method and system of the present invention which automatically identifies corresponding ends of a damaged cable pair, and temporarily restores telephone service to a subscriber affected by pulp cable damage.

In the preferred embodiment of the method of the present invention, a service restoration system (SRS) including first and second connector blocks is transported to a cable damage site. A craftsperson arbitrarily attaches a proximal end (that is, the end of the damaged cable pair closest to the cross connection box) of each damaged cable pair to a port on the first connector block. A distal end of each damaged cable pair is also arbitrarily attached to a port on the second connector block. The SRS is initialized so that the distal ends of the damaged cable pairs appear to be "unconnected" to a switch that serves the damaged cable pairs. A high priority line test is then performed by the serving switch. Subsequently, the serving switch provides directory number information associated with each "unconnected" cable pair. The directory number information is collected, and stored in a database for subsequent matching with directory number information provided by a subscriber. A directory number match enables the SRS to find corresponding proximal and distal ends of a single damaged cable pair. Once the corresponding ends are identified, the damaged ends are interconnected via SRS switch fabric, and telephone service is restored.

DETAILED DESCRIPTION

Figure 1:
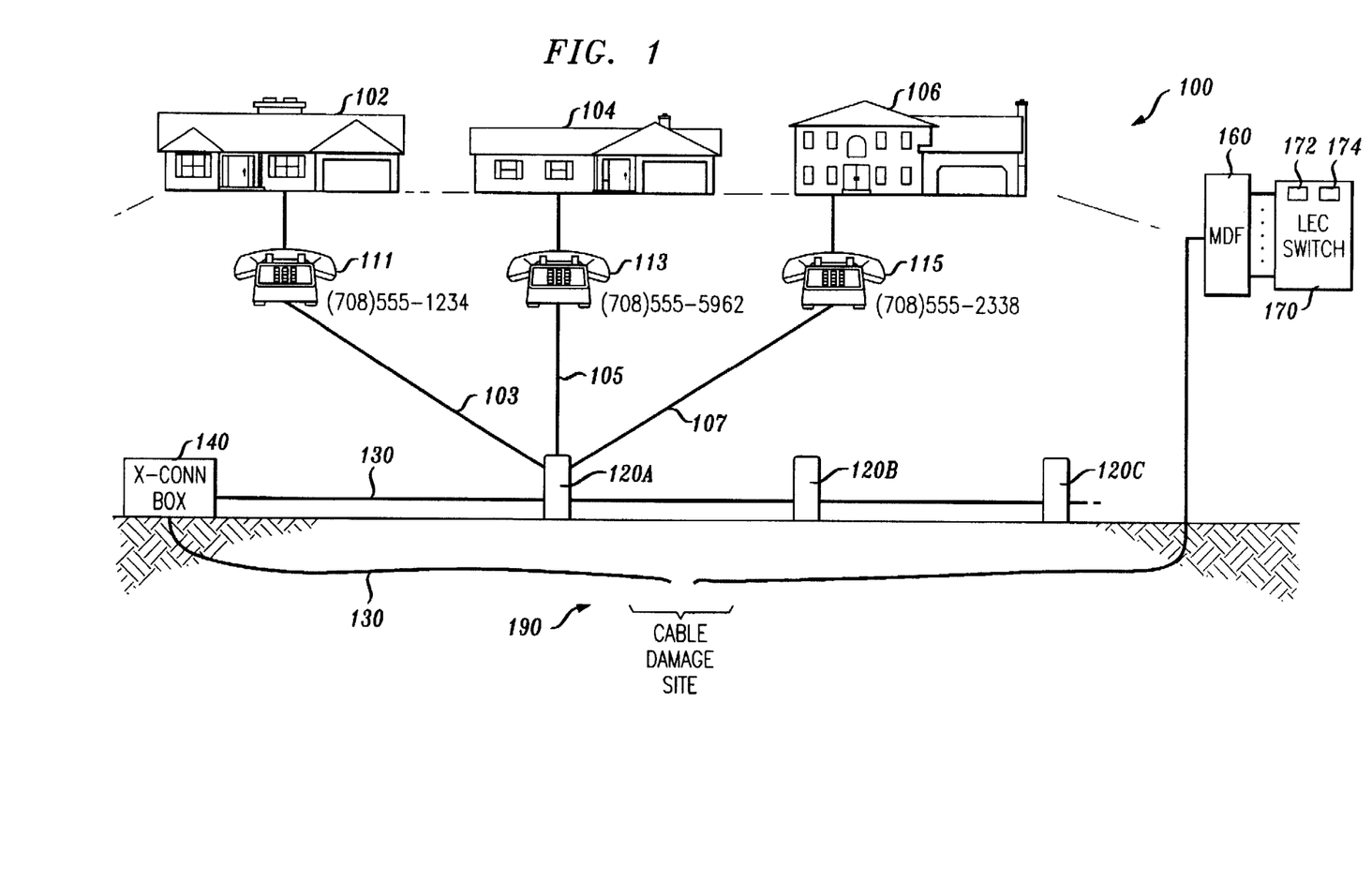
FIG. 1 shows a portion of a telecommunications system in which the method of the present invention may be practiced.

FIG. 1 is a representation of a portion of a LEC telecommunications system including a telephone cable which extends from a connection box to a main distributing frame.

In this embodiment, telecommunications system 100 serves home telephone subscribers who live in residences 102, 104 and 106. Each residence includes customer premises equipment (telephones) which are inter-connected to LEC telecommunications system 100 by individual cable pairs. The subscriber living in residence 102 is served by cable pair 103 which is attached to telephone 111, and is identified by the directory number "708-555-1234". The subscriber at residence 104 is served by cable pair 105 which is attached to telephone 113, and is identified by the directory number "708-555-5962", and the subscriber living in residence 106 is served by cable pair 107 which is attached to telephone 115, and is identified by the directory number "708-555-2338".

In this embodiment, each cable pair extends from a subscriber residence to a pedestal, such as pedestal 120A. The pedestal serves as a junction point for multiple cable pairs in a particular geographic area. Also shown are pedestals 120B, and 120C which are associated with other subscriber cable pairs (not shown). Multiple cable pairs extending from pedestals 120A–120C form distribution telephone cable 130, which extends from each pedestal to cross connection box 140. Telephone subscriber records and cable data associated with each cross connection box may be accessed by LEC craftspeople, if necessary. In this example, distribution cable 130 is a pulp cable which extends underground for a portion of its length, and terminates at a first side of main distributing frame 160. In alternative embodiments, cable 130 may be suspended by telephone poles to reach the main distributing frame. Individual cable pairs extend from a second side of main distributing frame 160 for interconnection to LEC switch 170. Switch 170 includes processor 172 and memory 174. Processor 172 is initialized to respond to requests received by a service restoration system. Memory 174 stores a service restoration protocol which is accessed by the switch when restoration procedures are executed.

Also shown is cable damage site 190 which represents the point at which pulp cable 130 has been damaged. Cable 130 includes cable pairs 103, 105, and 107, which serve the subscribers associated with residences 102, 104 and 106, respectively. Since cable 130 is damaged, it follows that cable pairs 103, 105, and 107 are also damaged.

Figure 2:
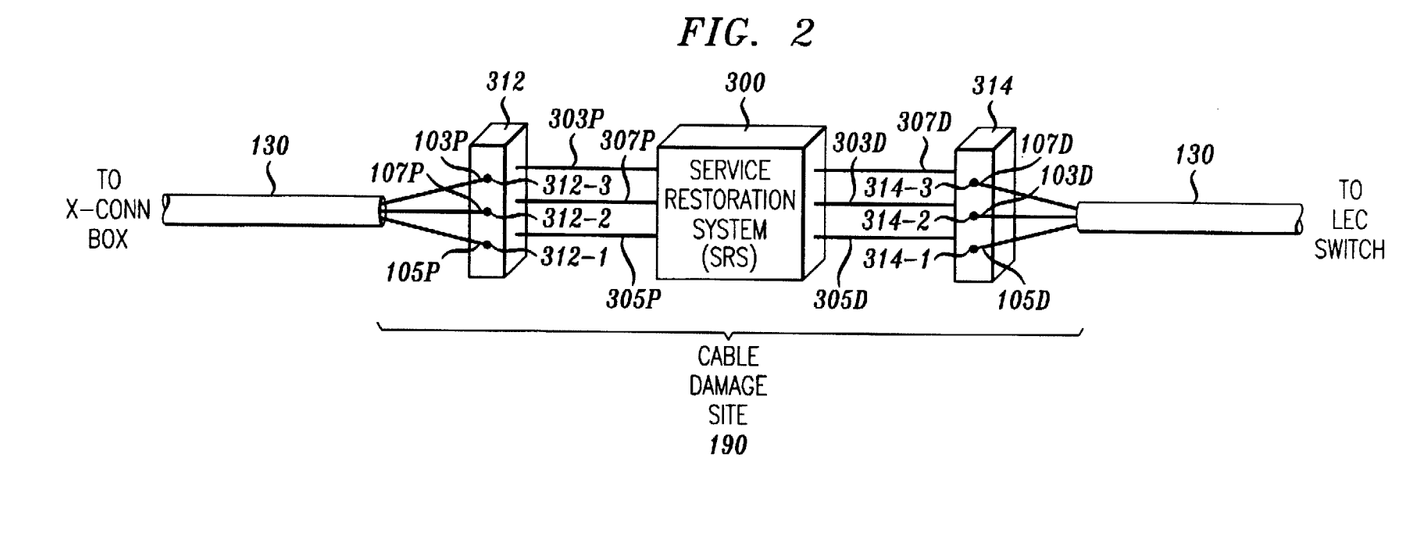
FIG. 2 shows a perspective view of a damaged cable site shown in FIG. 1.

FIG. 2 shows a perspective view of cable damage site 190 including service restoration system (SRS) 300. In accordance with the preferred embodiment of the method of the present invention, SRS 300 is transported to cable damage site 190 by a craftsperson. At the cable damage site, the craftsperson arbitrarily attaches the proximal ends (that is, the damaged cable pair ends closest to cross connection box 140) to ports on first connector block 312. In this case, proximal ends 103P, 105P and 107P are attached to first connector block ports 312-3, 312-1 and 312-2, respectively. An SRS proximal cable pair link, which corresponds to each proximal cable pair end, interconnects the cable pairs attached to the first connector block ports to SRS 300. In this embodiment, SRS proximal cable pair links 303P, 305P and 307P interconnect proximal cable pair ends 103P, 105P and 107P, respectively, to SRS 300. Distal cable pair ends, defined as the damaged cable pair ends farthest away from cross connection box 140, are also arbitrarily attached to ports on second connector block 314. Particularly, distal ends 103D, 105D, and 107D are attached to second connector block ports 314-2, 314-3 and 314-1, respectively. SRS distal cable pair links 303D, 305D and 307D interconnect the cable pair ends attached to second connector block 314 to SRS 300. In this example, distal cable pair links 303D, 305D and 307D correspond to distal damaged cable pair ends 103D, 105D and 107D, respectively.

Figure 3A:
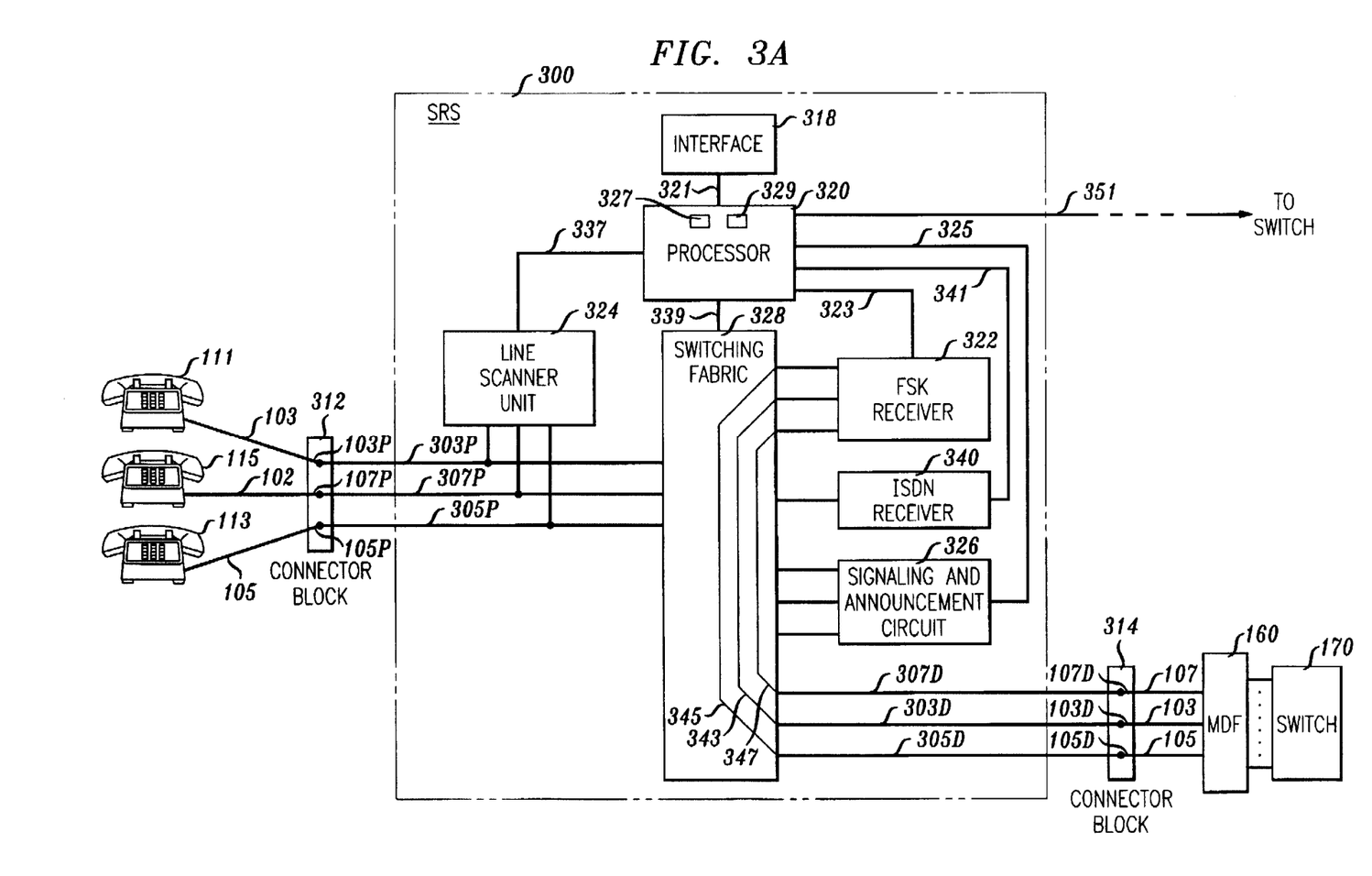
FIG. 3A is a simplified block diagram of a service restoration system operating in cable pair identification mode.
Figure 3B:
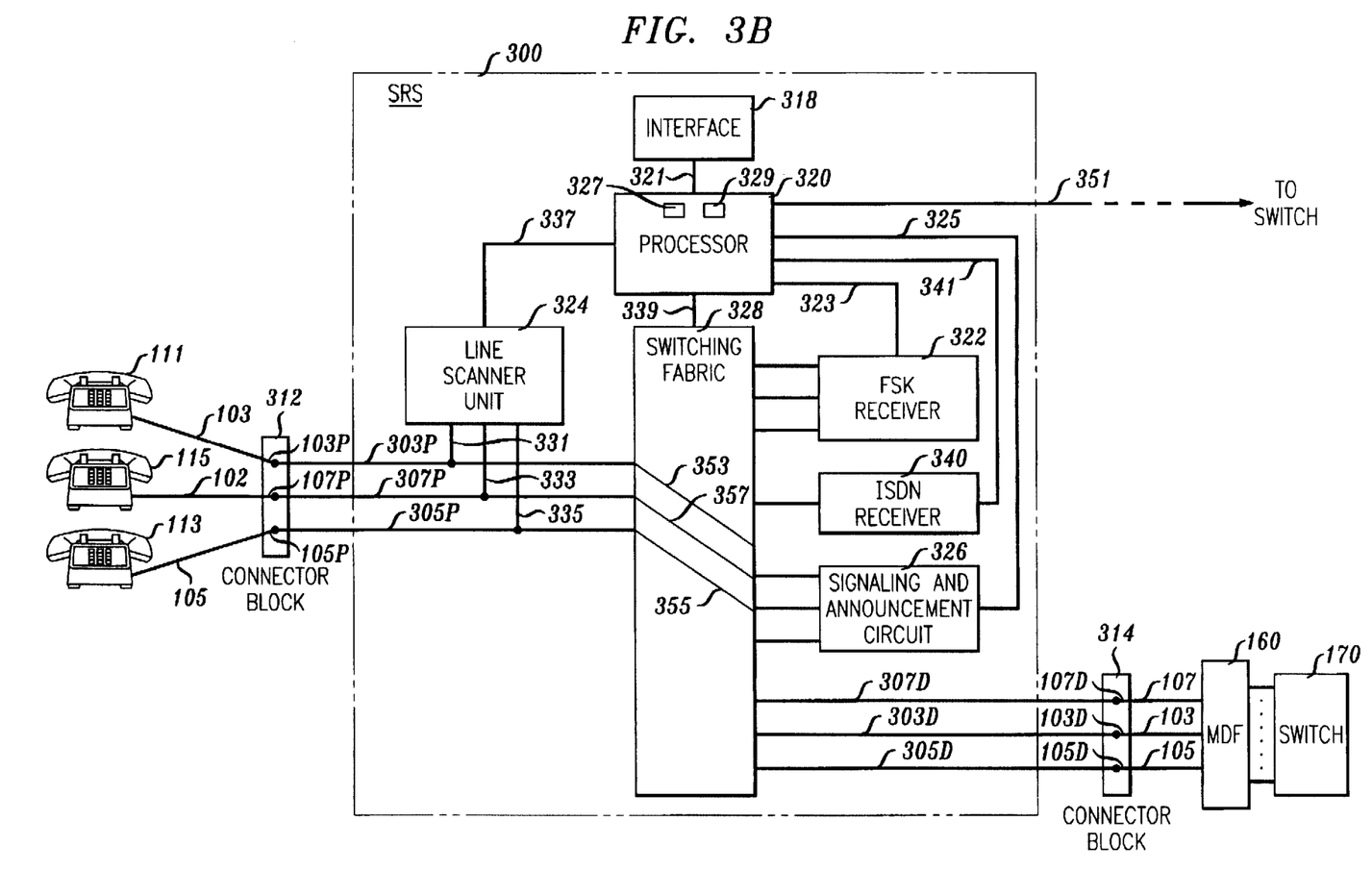
FIG. 3B is a simplified block diagram of the service restoration system operating in subscriber identification mode.
Figure 3C:
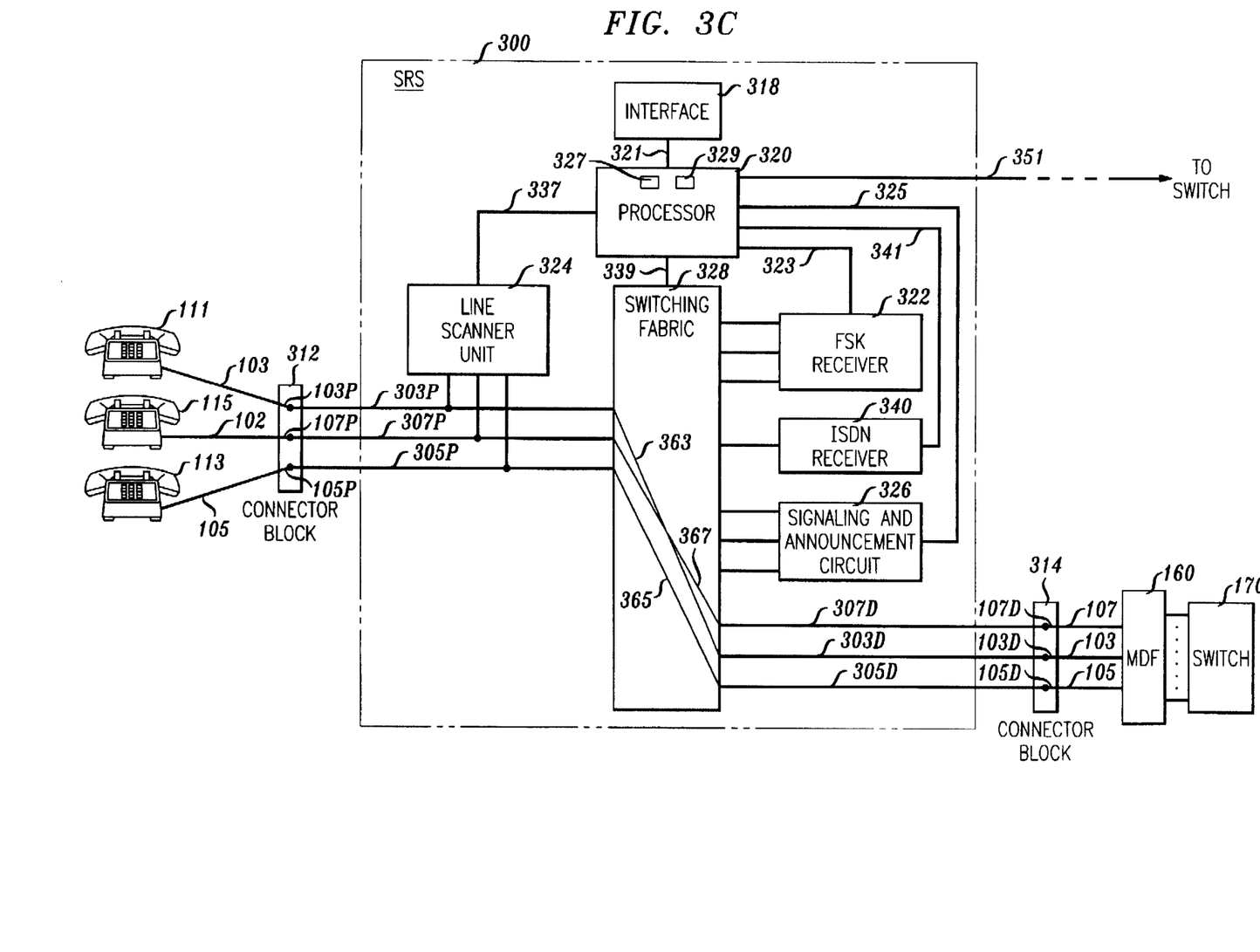
FIG. 3C is a simplified block diagram of the service restoration system operating in restoration mode.

To restore telephone service for any given damaged cable pair, SRS 300 may simultaneously operate in the following three modes: switch cable pair identification mode; subscriber cable pair identification mode; and service restoration mode. The various operational states of SRS 300 are shown in FIGS. 3A–3C. Although only three damaged cable pairs (i.e. 103, 105, and 107) are shown for clarity, operational embodiments of SRS 300 accommodate many more damaged cable pairs.

FIG. 3A is a simplified block diagram of SRS 300 operating in switch cable pair identification mode. SRS 300 comprises: interface unit 318 for providing information to system operators; processor 320 for administering global control functions; switch cable pair identification database 327 for storing switch-provided directory number information; subscriber cable pair identification database 329 for storing subscriber-provided directory number information; frequency shift key (FSK) receiver 322 for receiving FSK messages; ISDN receiver 340 for receiving messages in ISDN format; line scanner circuit 324 for determining when customer premises equipment associated with a particular damaged cable pair goes "off-hook"; and signaling and announcement circuit (SAC) 326 for issuing announcements to subscribers. Also shown is switch fabric 328 for interconnecting the damaged cable pair ends to a switch, as described below.

The various internal components of SRS 300 are connected by designated links. Specifically, message links 321, 323, 325, 339 and 341 interconnect processor 320 to interface unit 318, FSK receiver 322, SAC 326, line scanner unit 324, and ISDN receiver 340, respectively. Signaling link 339 inter-connects the processor with switch fabric 328. An optional switch signaling link 351 inter-connects SRS 300 to LEC switch 170 which serves the damaged cable pairs.

Also shown are cable pairs 103, 105 and 107 which are attached at their proximal damaged ends to first connector block 312. Subscriber telephones 111, 113 and 115 which are served by cable pairs 103, 105, 107, respectively, are shown for clarity. Similar to FIG. 1, the proximal cable pairs ends are shown in the arbitrary order in which they were attached to first connector block 312 by the craftsperson. Proximal SRS cable links 303P, 305P, 307P extend from first connector block 312 to switch fabric 328 enabling connection of the damaged cable pairs to the SRS. Correspondingly, distal ends 103D, 105D and 107D are shown in the order of attachment to second connector block 314. Distal SRS cable links 303D, 305D, and 307D also extend to switch fabric 328. In cable pair identification mode, processor 320 uses link 339 to initialize switch fabric 328 so that all distal SRS cable links 303D, 305D and 307D (and correspondingly, all connections to the distal SRS cable links, namely, 103D, 105D and 107D) appear to system 100 to be "open" or, unconnected to subscriber customer premises equipment. Subsequently, a verbal message requesting that a high priority "line test" be performed by the serving switch is relayed by the craftsperson to switch maintenance personnel. In alternative embodiments, processor 320 may send the line test request to the serving switch in a signaling message delivered via signaling link 351. Subsequent to the line test, a second message is relayed to switch maintenance personnel requesting that the serving switch repetitively transmit, over an appropriate cable pair, the directory number which identifies the cable pair determined to be "open" as a result of the line test. The serving switch is responsive to the second message only if it has been initialized with a SRS interaction protocol. In this embodiment, switch processor 172 has been initialized to respond to SRS requests. Accordingly, switch 170 transmits, via main distributing frame 160, a frequency shift key (FSK) message including the directory numbers "708-555-1234", "708-555-5962" and "708-555-2338" to SRS 300 over distal damaged cable pair ends 103D, 105D and 107D, respectively.

If a subscriber is served by a cable pair that supports ISDN customer premises equipment, an ISDN protocol message including the directory number identifying the cable pair is transmitted by the serving switch. The damaged pulp cable may also serve private lines which do not terminate at a LEC switch. In such cases, a private line test system is attached to the cable pair to generate a unique FSK circuit identification code which is transmitted to the SRS.

Once the LEC switch begins repetitively transmitting a directory number, the SRS processor instructs the switch fabric to sequentially establish a call path from each distal cable pair link to FSK and ISDN receivers. In other words, processor 320 requests the establishment of a call path, via switch fabric 328, between distal SRS cable links 303D, 305D and 307D, and either an FSK and ISDN receivers. In this example, call paths 343, 345 and 347 inter-connect distal SRS cable links 303D, 305D and 307, respectively, to FSK receiver 322. Processor 320 then retrieves the messages, and corresponding call path and connector block port information from FSK receiver 322 via data link 323. The retrieved message, including the directory number identifying the cable pair over which the message was delivered, is stored in switch cable pair identification database 327. Directory number messages are continually transmitted by switch 170 until a connection is detected by the switch, as described below.

FIG. 3B is a simplified block diagram of SRS 300 operating in subscriber cable pair identification mode. Line scanner circuit 324 is inter-connected to the proximal SRS cable link of each damaged cable pair by a designated scanning link. In this embodiment, proximal cable links 303P, 305P and 307P are interconnected to line scanner circuit 324 by scanning links 331, 333, and 335, respectively. Scanner circuit 324 provides power to the loop, and continually monitors each damaged cable pair, via the scanning links, for an "off-hook" signal. An off-hook signal is an indication that a subscriber (hereinafter, a "caller") has altered the state of customer premises equipment to place a call. In this case, assume that detection of an off-hook signal implies that a caller has picked up a telephone handset to place a call. When an off-hook signal is detected, circuit 324 sends an offhook message to processor 320 via signaling link 329. In response to the off-hook message, a call path is established to connect the proximal SRS cable link (and hence, its associated proximal damaged cable pair end) to SAC 326. Specifically, call paths 353, 355, and 357 are established as a result of messages sent from processor 320 to switch fabric 328 over message link 339 instructing the switch fabric to establish a connection between each proximal SRS cable link and SAC 326. Once a connection to SAC 326 is made, a service disruption announcement which informs the caller that cable damage has occurred, and prompts the caller for the directory number of the telephone being used to place the call is issued. The directory number provided by the caller is collected, identified as being received over a particular SRS proximal cable pair link, and stored in subscriber cable pair identification database 329. In the case of private line circuits and ISDN circuits, a craftsperson at the cross connection box must use LEC records to identify those cable pairs which serve these lines, and attach a test system to the cross connection box termination point of the cable pairs to signal the cable pair identity to SRS 300.

FIG. 3C is a simplified block diagram of SRS 300 operating in service restoration mode. In this mode, processor 320 matches corresponding proximal and distal SRS cable links of a particular damaged cable pair using directory number information stored in cable pair identification databases 327 and 329. Since each proximal SRS cable link is identified by a subscriber-provided directory number stored in database 329, and each distal SRS cable link is identified by a switchprovided directory number stored in database 327, processor 320 can simply scan databases 327 and 329 to search for a directory number match. If a directory number match is found, processor 320 issues a command to switch fabric 328, via message link 327, which directs the switch fabric to establish a call path between the proximal and distal SRS cable links identified by the common directory number. In this example, call path 363 is established to inter-connect SRS cable links 303P and 303D which correspond to damaged cable pair 103, and serve directory number "708-555-1234". Similarly, call path 365 inter-connects SRS cable links 305P and 305D, and call path 367 inter-connects SRS cable links 307P and 307D. Establishment of a call path between proximal and distal SRS cable links automatically restores dial tone to the subscriber served by the damaged cable pair. Further, once the call path is established, switch 170 receives a "seized line" indication over the cable pair. In accordance with initialized restoration protocol, a seized line indication triggers the serving switch to cease transmission of the directory number message identifying the cable pair.

SRS 300 periodically generates a status report indicating the connector block port correspondence between proximal and distal cable pair ends so that the craftsperson can retrieve the information from interface unit 318, and use it for permanent restoration procedures. In this example, the port correspondence between proximal cable link 1.03P and distal cable link 103D is port 312-3 and port 314-2. The craftperson uses techniques known in the art, such as Y-splicing, to permanently splice the proximal and distal ends of cable pair 103 while both ends are still connected to SRS 300. The SRS-generated status report also contains statistical information, such as the ratio of cable pairs with restored service to cable pairs which are still non-functional. Similarly, switch 170 generates a status report indicating the ratio of the number of seized lines to unseized lines (i.e. lines for which directory number messages are still being transmitted) for use by switch maintenance personnel.

Figure 3D:
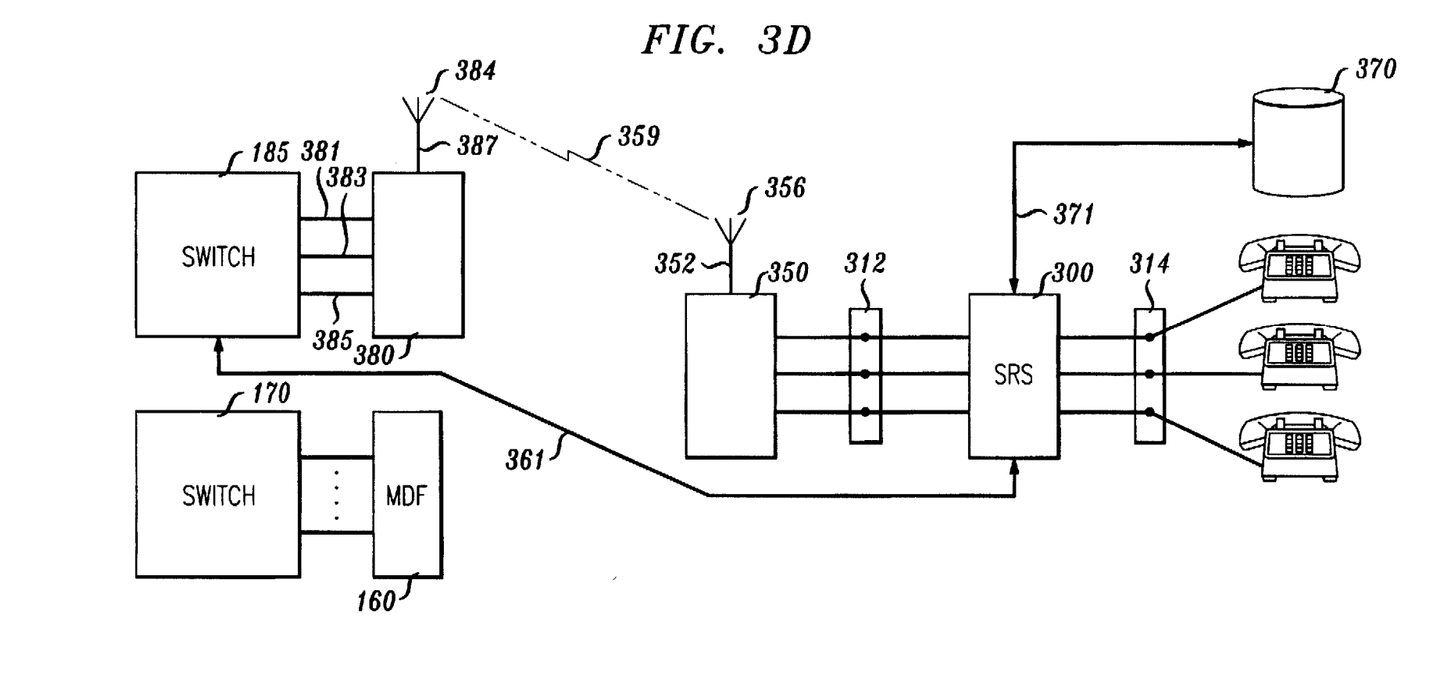
FIG. 3D is a simplified block diagram of the service restoration system operating with an alternate switch.

In some circumstances, the switch that serves the damaged distribution cable may also be damaged. In such a case, the SRS is used to redirect service to subscribers affected by cable damage from an original serving switch to an alternate switch. FIG. 3D shows SRS 300 operating in conjunction with an alternate switch 185. In this embodiment, the damaged cable pairs do not terminate at main distributing frame 160 but are inter-connected to analog-to-digital converter (hereinafter, "D" bank) 350. D-bank 350 is inter-connected to antenna 354 via trunk connection 352. In this embodiment, SRS 300 is equipped with recent change message link 361 which is connected to alternate switch 185. SRS 300 also includes number portability update link 371 which is connected to number portability database 370. In alternative embodiments, links 361 and 371 may be wireless links which are established via D-banks, as is known in the art. Also shown is D-bank 380 which is inter-connected to alternate switch 185 via cable pairs 381, 383, and 385. Antenna 384 serves D-bank 380 via trunk connection 387.

When SRS 300 operates in conjunction with an alternate switch, such as switch 185, subscribers receive a service disruption message, and a prompt for a directory number in the same manner described in FIG. 3B. Upon receipt of a subscriber directory number, SRS 300 sends a recent change message, including the directory number received from the subscriber, to alternate switch 185 over message link 361. The recent change message requires alternate switch 185 to designate a cable pair and line appearance to serve the directory number received from the subscriber. Also, an update to number portability database 370 indicating that alternate switch 185 now serves the subscriber-provided directory number is made by SRS 300 via signaling link 363. Number portability database 370 must be updated so that the subscriber can receive incoming calls via alternate switch 185. If the subscriber wishes to place an outgoing call, the call is switched by switch fabric 328, and forwarded to alternate switch 185 via microwave link 359 established between antennas 354 and 384.

Figure 4:
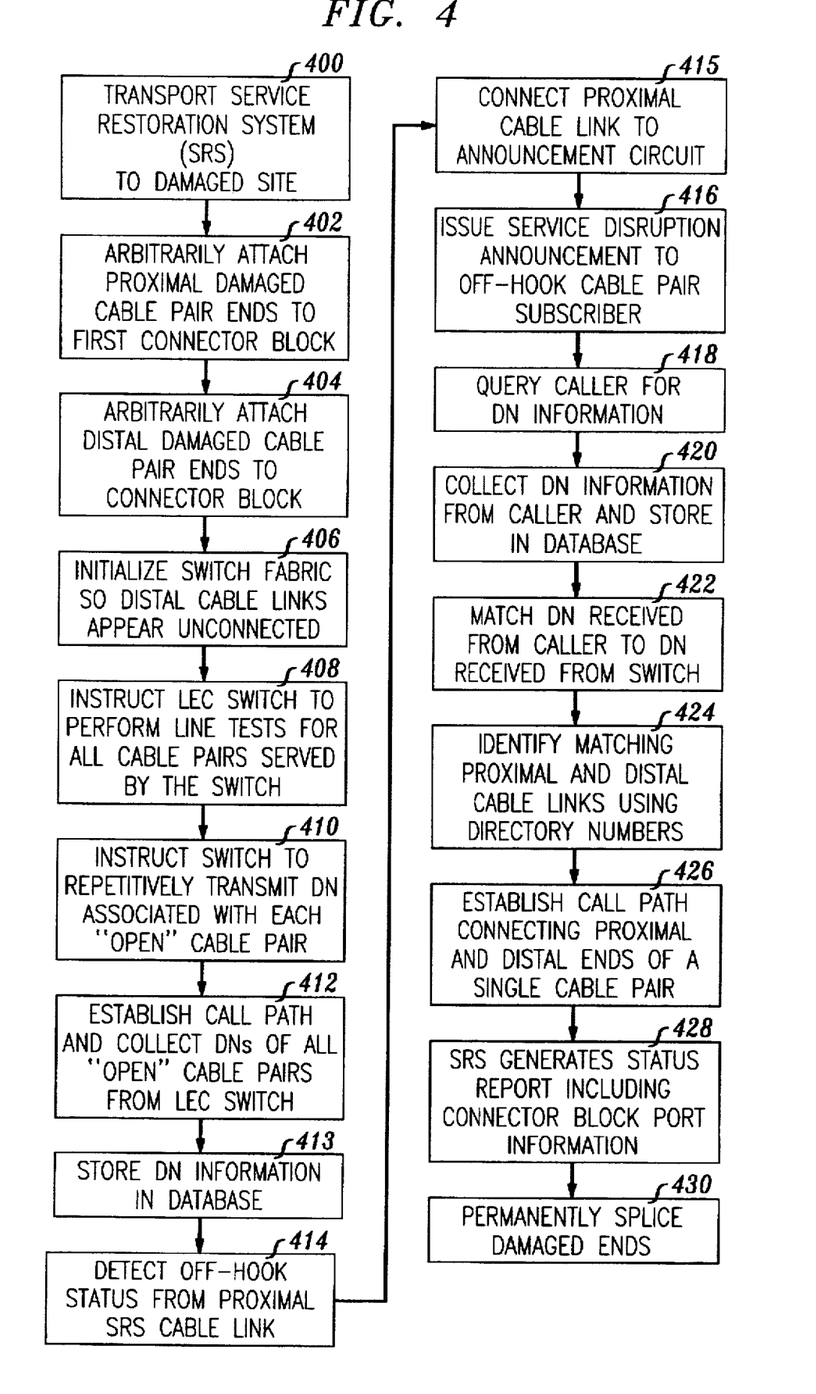
FIG. 4 is a flow diagram of the steps performed by the service restoration system to identify damaged cable pairs, and reinstate telephone service to affected subscribers.

FIG. 4 is a flow diagram of the steps performed by SRS 300 to identify corresponding ends of a damaged cable pair, and restore telephone service to subscribers affected by damage to a pulp cable. For purposes of example, assume that the subscriber (hereinafter, the "caller") living in residence 102 served by cable pair 103 wishes to place a call but does not realize that his cable pair has been damaged.

The identification and restoration process begins in step 400 when SRS 300 is transported to the damaged cable pair site by a LEC craftsperson. In step 402, the craftsperson arbitrarily attaches the proximal ends of all damaged cable pairs, including proximal end 103P of the caller's cable pair, to a port on first connector block 312. The process continues to step 404 in which the craftsperson arbitrarily attaches the distal ends of all damaged cable pairs, including distal end 103D of the caller's cable pair, to a port on the second connector block 314.

SRS 300 operates in switch cable pair identification mode in step 406 when processor 320 initializes switch fabric 328 so that all connections terminating on the switch fabric appear to be unconnected. In step 408, the craftsperson relays a message to switch maintenance personnel requesting that serving switch 170 perform a high-priority line test for all cable pairs. The line test identifies "open" or, unconnected cable pairs. In step 410, a message is relayed to switch maintenance personnel requesting serving switch 170 to transmit, over the cable pair, repetitive messages identifying the directory number of the "unconnected" cable pairs. In step 412, SRS 300 establishes a call path from the distal SRS cable link corresponding to the "unconnected" cable pair to a receiver, such as FSK receiver 322. The call path is established via switch fabric 328 as each directory number message is received from the serving switch. In this example, the directory number "708-555-1234" is sent over distal cable link 303D, and call path 343 to FSK receiver 322. In step 413, SRS 300 collects the directory number, and its corresponding distal cable link and connector block port location for storage in switch cable pair identification database 327.

SRS 300 operates in subscriber cable pair identification mode as the process continues to step 414 in which the SRS detects an off-hook signal from a damaged cable pairs. In this example, line scanner circuit 324 detects an off-hook signal from proximal cable link 303P (which corresponds to damaged cable pair 103) via scanner link 333, and sends an off-hook message including the identification of proximal cable link 303P to processor 320. In an alternative embodiment, a craftsperson may simulate an off-hook signal from the cross connection box. The process continues to step 415 in which SRS 300 establishes a call path between the proximal cable link from which the off-hook signal was detected, and an announcement circuit. In this example, call path 353 is established via switch fabric 328 between cable link 303P and SAC 326. In step 416, SAC 326 issues a service disruption announcement which informs the caller that cable damage has occurred. In step 418, SAC issues another announcement querying the caller for the directory number associated with the telephone from which the call is being made. If the craftsperson is making the call from the cross connection box, LEC records are used to provide the directory number information. In step 420, SRS 300 collects the directory number, and stores it in subscriber cable pair identification database 329.

SRS 300 operates in service restoration mode as the process continues to step 422 in which the SRS matches directory numbers contained in the cable pair identification databases 327 and 329. In step 424, SRS 300 identifies a proximal end and distal end of a single cable pair based on a match of directory number information contained in the cable pair identification databases. In this example, SRS 300 identifies proximal cable link 303P, and distal cable link 303D as serving the same directory number based on information received from the serving switch, and the caller. The process continues to step 426 in which SRS 300 establishes a call path, via switch fabric 328, which effectively splices together the proximal end and the distal end of a single damaged cable pair by inter-connecting the proximal and distal SRS cable links associated with the damaged cable pair. In this case, SRS 300 establishes call path 363 which inter-connects proximal cable link 303P to distal cable link 303D of damaged cable pair 103, and SRS 300 generates a line seizure signal which is an indication to the LEC switch to terminate the repetitive directory number transmission. Upon establishing the call path, the caller is able to place telephone calls in a routine manner. In step 428, SRS 300 generates a status report including the connector block port locations of corresponding proximal and distal ends of a damaged cable pairs. The process ends in step 430 in which the proximal and distal ends of a damaged c able pair are permanently spliced together.

The present invention is advantageous because tedious manual identification of corresponding ends of a damaged cable pair in a pulp cable is eliminated, and telephone service is quickly restored. While the invention has been particularly illustrated and described with reference to a preferred embodiment, it is understood that those skilled in the art may devise numerous other arrangements without departing from the scope of the invention.

What is claimed is:

1. In a telecommunication system comprising a switch that serves a plurality of subscriber cable pairs, wherein the cable pairs are extended from a cross connection box to the switch via pulp cable, a method for identifying each damaged end of a cable pair comprises the steps of:

attaching a proximal damaged cable pair end of the cable pair to a port on a first connector block of a service restoration system (SRS);

attaching a distal damaged cable pair end of the cable pair to a port on a second connector block of the SRS;

initializing the SRS such that the distal damaged cable pair end appears to be unconnected;

receiving in the SRS directory number information from the switch over the distal damaged cable pair end;

receiving in the SRS subscriber-provided directory number information over the proximal end of the damaged cable pair; and matching a distal end of a damaged cable pair to a proximal end of a damaged cable pair using directory number information.

2. The method of claim 1 wherein the step of receiving directory number information from the switch comprises the step of:

receiving a frequency shift key (FSK) message from the switch over the damaged distal cable pair end.

3. The method of claim 1 wherein the step of matching directory number information from the subscriber, and the switch comprises the step of:

scanning a switch cable pair identification database and a subscriber cable pair identification database for a directory number match.

4. The method of claim 1 wherein the step of establishing a connection between the proximal damaged cable pair end and the distal damaged cable pair end comprises the step of:

the SRS establishing a call path between a proximal SRS cable pair link and a distal SRS cable pair link via switch fabric.

5. The method of claim 1 and further comprising the steps of:

the SRS transmitting a directory number received from the subscriber to an alternate switch; and the alternate switch designating a cable pair on the alternate switch to serve the subscriber's directory number via a wireless link interconnecting the alternate switch with the serving switch.

6. The method of claim 5 and further comprising the step of:

updating a number portability database with alternate switch information so that incoming calls may be received by the subscriber.

7. In a telecommunications system utilizing a distribution cable including a plurality of indistinguishable subscriber cable pairs, wherein the distribution cable terminates at a cross connection box at one end, and terminates at a main distributing frame of a switch that serves the plurality of subscriber cable pairs at another end, a method for restoring service to individual damaged cable pairs comprises the steps of:

attaching a proximal end of a damaged cable pair to a port on a first connector block of a service restoration system (SRS);

attaching a distal end of the damaged cable pair to a port on a second connector block;

receiving in the SRS directory number information from the switch over the distal end of the damaged cable pair;

receiving in the SRS subscriber-provided directory number information over the proximal end of the damaged cable pair;

the SRS establishing a call path between the proximal end of the damaged cable pair and the distal end of the damaged cable pair end using the directory number information provided by the subscriber and the switch;

generating a status report identifying the port on the first connector block at which the proximal end of the damaged cable pair is attached, and the port on the second connector block at which the distal end of the damaged cable pair is attached; and splicing together the proximal and distal ends of the damaged cable pair based on the port information.

8. In a telecommunications system comprising a switch that serves a plurality of subscribers via cable pairs, a transportable, switch-independent service restoration system for identifying damaged cable ends, and restoring telecommunications service to subscribers affected by cable damage comprises:

a processor for administering maintenance and global control functions;

a switch cable pair identification database for storing directory number information received from the switch;

a subscriber cable pair identification database for storing directory number information received from a subscriber; and means for interconnecting a first damaged end and a second damaged end of a cable pair by matching directory number information stored in the switch cable pair identification database and the subscriber cable pair identification database.

9. The service restoration system of claim 8 further comprising:

a first connector block including a plurality of ports; and a second connector block including a plurality of ports.

10. The service restoration system of claim 8 wherein telecommunication services for the subscribers affected by cable damage are provided by an alternate switch.

11. A telecommunications service restoration system (SRS) comprises:

a processor for administering global maintenance and control functions;

a line scanner circuit inter-connected to the processor for identifying off-hook status from a damaged cable pair;

an announcement circuit inter-connected to the processor for issuing service disruption announcements to affected subscribers;

receiver means for storing directory number information from a serving switch; and means for inter-connecting the damaged cable pair to the serving switch by matching directory number information from the receiver means with information provided by the affected subscribers.

12. The telecommunications SRS of claim 11 and further comprising a database for storing directory number information received from affected subscribers.

13. The telecommunications SRS of claim 11 wherein the receiving means is a frequency shift key (FSK) receiver.

14. The method of claim 7 wherein the step of the SRS establishing a call path between the proximal end of the damaged cable pair and the distal end of the damaged cable pair comprises the step of:

using a switch fabric in the SRS to establish the call path.

* * * * *